United States Patent
Mika

[11] Patent Number: 6,142,515
[45] Date of Patent: Nov. 7, 2000

[54] AIR BAG INFLATOR WITH HEAT SINK AND RETAINER

[75] Inventor: Darin P. Mika, Mesa, Ariz.

[73] Assignee: TRW Inc., Lyndhurst, Ohio

[21] Appl. No.: 09/263,912

[22] Filed: Mar. 5, 1999

[51] Int. Cl.[7] .................................................. B60R 21/26
[52] U.S. Cl. .......................... 280/736; 280/741; 102/531
[58] Field of Search ................................... 280/736, 740, 280/741, 742; 102/530, 531

[56] References Cited

U.S. PATENT DOCUMENTS

| | | |
|---|---|---|
| 4,017,100 | 4/1977 | Gehrig et al. . |
| 4,131,299 | 12/1978 | Ono et al. . |
| 5,551,724 | 9/1996 | Armstrong, III et al. . |
| 5,564,741 | 10/1996 | Ward et al. ............................. 280/740 |
| 5,951,040 | 9/1999 | McFarland et al. . |

FOREIGN PATENT DOCUMENTS 9425315  11/1994  WIPO .

*Primary Examiner*—Peter C. English
*Attorney, Agent, or Firm*—Tarolli, Suneheim, Covell, Tummino & Szabo L.L.P.

[57] ABSTRACT

An inflator (10) for inflating an inflatable vehicle occupant protection device includes a housing (20) defining a generally ring-shaped propellant chamber (200) extending around an axis (50) of the inflator. The housing (20) has a fluid outlet (52) for directing flow of inflation fluid out of the housing to the inflatable device. A quantity of ignitable propellant (240) is located in the propellant chamber for, when ignited, producing inflation fluid for inflating the inflatable device. The housing (20) has a fluid passage (90) between the propellant chamber (200) and the fluid outlet (52). The fluid passage (90), which is normally closed, opens upon actuation of the inflator (10) to enable fluid flow from the propellant chamber (200) to the fluid outlet (52). The fluid passage (90), when open, has a variable flow area depending upon the pressure in the housing (20). A heat sink (270) is located in the propellant chamber (200) between the ignitable propellant (240) and the fluid passage (90) for cooling and filtering inflation fluid flowing from the propellant chamber through the fluid passage. The inflator (10) includes a retainer (280) in the propellant chamber (200) between the ignitable propellant (240) and the fluid passage (90) for retaining the heat sink (270) in the propellant chamber upon actuation of the inflator.

17 Claims, 6 Drawing Sheets

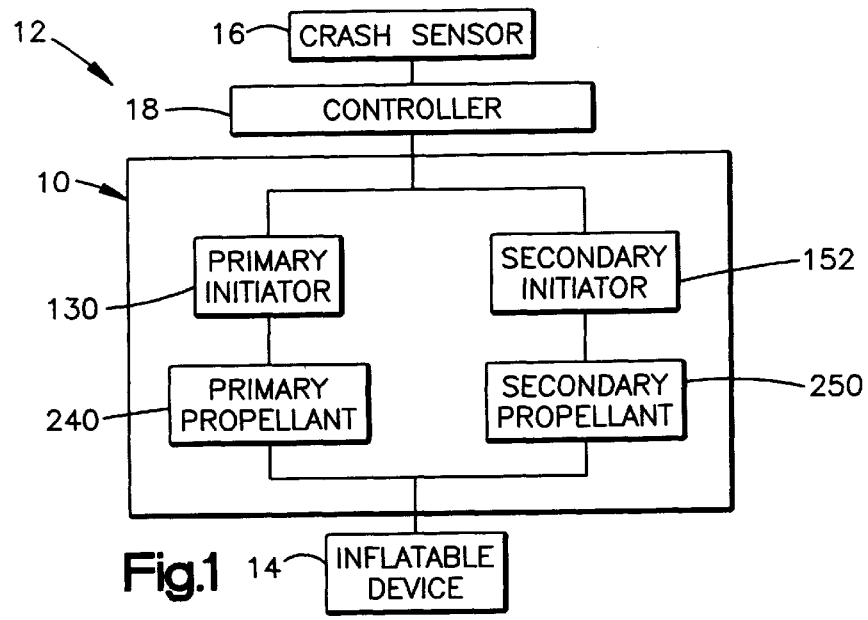
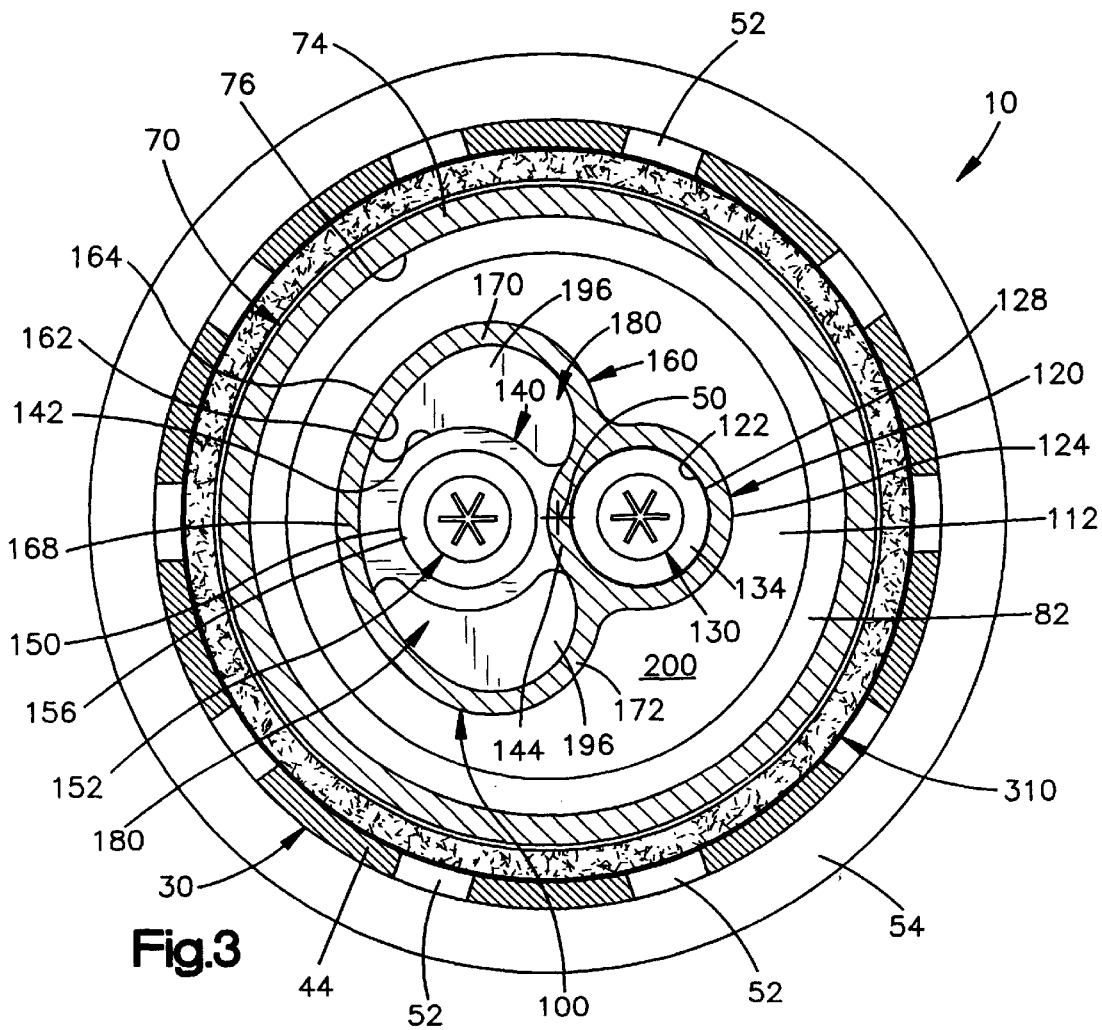

AIR BAG INFLATOR WITH HEAT SINK AND RETAINER

BACKGROUND OF THE INVENTION

1. Technical Field

The present invention relates to an apparatus for inflating an inflatable vehicle occupant protection device.

2. Description of the Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an inflator for inflating an inflatable vehicle occupant protection device. The inflator comprises a housing defining a generally ring-shaped propellant chamber extending around an axis of the inflator. The housing has a fluid outlet for directing flow of inflation fluid out of the housing to the inflatable device. A quantity of ignitable propellant is located in the propellant chamber for, when ignited, producing inflation fluid for inflating the inflatable device. The housing has a fluid passage between the propellant chamber and the fluid outlet. The fluid passage, which is normally closed, opens upon actuation of the inflator to enable fluid flow from the propellant chamber to the fluid outlet. The fluid passage, when open, has a variable flow area depending upon the pressure in the housing. A heat sink is located in the propellant chamber between the ignitable propellant and the fluid passage for cooling and filtering inflation fluid flowing from the propellant chamber through the fluid passage. The inflator includes a retainer in the propellant chamber between the ignitable propellant and the fluid passage for retaining the heat sink in the propellant chamber upon actuation of the inflator.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus including an inflator constructed in accordance with a first embodiment of the present invention;

FIG. 3 is a radial sectional view along line 3—3 in FIG. 2 showing the inflator of FIG. 1 in an unactuated condition;

DESCRIPTION OF A PREFERRED EMBODIMENT

Figure 2:
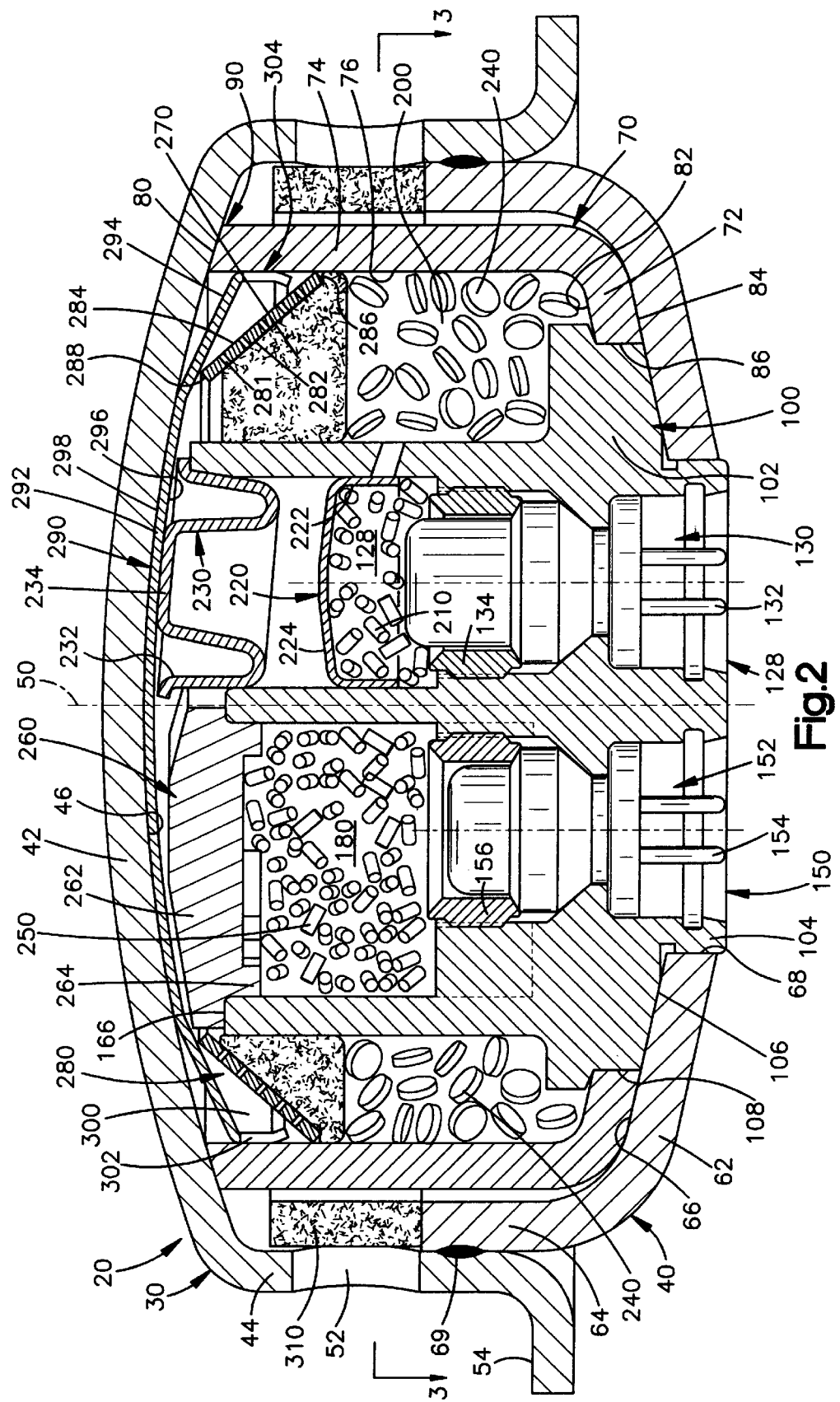
FIG. 2 is an axial sectional view showing the inflator of FIG. 1 in an unactuated condition.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiment of the invention, the protection device 14 is an air bag for helping to protect a driver of a vehicle. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle, such as the vehicle steering wheel, as a result of a crash.

The apparatus 12 also includes a crash sensor 16. The crash sensor 16 is a known device which senses a vehicle condition that indicates the occurrence of a crash. If the vehicle condition sensed by the crash sensor 16 is at or above a first predetermined threshold level, it indicates the occurrence of a crash having a first predetermined threshold level of severity. The first threshold level of crash severity is a level at which inflation of the air bag 14 at a relatively low rate is desired for protection of a vehicle occupant. If the vehicle condition sensed by the crash sensor 16 is at or above a second predetermined threshold level, it indicates the occurrence of a crash having a second, higher, predetermined threshold level of severity. The second threshold level of crash severity is a level at which inflation of the air bag 14 at a relatively high rate is desired for protection of a vehicle occupant.

The vehicle condition sensed by the crash sensor 16 preferably is sudden vehicle deceleration that is caused by a collision. The magnitude and duration of the deceleration are measured by the crash sensor 16. If the magnitude and duration of the deceleration meet or exceed predetermined threshold levels, they indicate the occurrence of a crash that meets or exceeds the predetermined threshold levels of crash severity. A suitable deployment signal is then transmitted to a controller 18 to indicate the occurrence of such a crash. The controller 18 sends an actuation signal to the inflator 10 to actuate the inflator.

The inflator 10 (FIGS. 2–4) includes a generally cylindrical housing or shell 20. The inflator 10 has a circular configuration as viewed from above in FIG. 2 (as shown in FIG. 3). The housing 20 includes a first or upper (as viewed in FIG. 2) housing part 30, referred to herein as a diffuser, and a second or lower (as viewed in FIG. 2) housing part 40, referred to herein as a closure.

The diffuser 30 has an inverted, cup-shaped configuration centered on an axis 50 of the inflator 10. The diffuser 30 includes a radially extending end wall 42 and an axially extending side wall 44. The end wall 42 of the diffuser 30 is domed, that is, has a curved configuration projecting away from the closure 40. The end wall 42 has an inner side surface 46.

The side wall 44 of the upper housing part 30 has a cylindrical configuration centered on the axis 50. A plurality of inflation fluid outlets 52 are disposed in a circular array on the side wall 44. Each one of the inflation fluid outlets 52 extends radially through the side wall 44. The outlets 52 enable flow of inflation fluid out of the inflator 10 to inflate the air bag 14. The outlets 52, as a group, have a fixed, predetermined flow area. An annular inflator mounting flange 54 extends radially outward from the side wall 44 at a location below (as viewed in FIG. 2) the inflation fluid outlets 52.

The closure 40 has a cup-shaped configuration including a radially extending end wall 62 and an axially extending side wall 64. The end wall 62 of the closure 40 is domed, that is, has a curved configuration projecting away from the upper housing part 30. The end wall 62 has an inner side surface 66 presented toward the end wall 42 of the upper housing part 30. A circular opening 68 in the end wall 62 is centered on the axis 50.

The side wall 64 of the closure 40 has a cylindrical configuration centered on the axis 50. The outer diameter of the side wall 64 of the closure 40 is approximately equal to the inner diameter of the side wall 44 of the diffuser 30. The closure 40 is nested inside the upper housing part 30, as seen in FIG. 2. The side wall 64 of the closure 40 is welded to the side wall 44 of the upper housing part 30 with a single, continuous weld 69.

The inflator 10 includes a first flow control member in the form of a combustor or combustion cup 70. The combustion cup 70 has an annular configuration including a radially extending lower end wall 72 and an axially extending side wall 74. The side wall 74 has an inner side surface 76.

The side wall 74 of the combustion cup 70 is disposed radially inward of the side walls 44 and 64 of the diffuser 30 and closure 40, respectively. The side wall 74 has a ring-shaped upper end surface 80. The upper end surface 80 has a generally frustoconical configuration which seals against the inner side surface 46 of the end wall 42 of the upper housing part 30.

Figure 5:
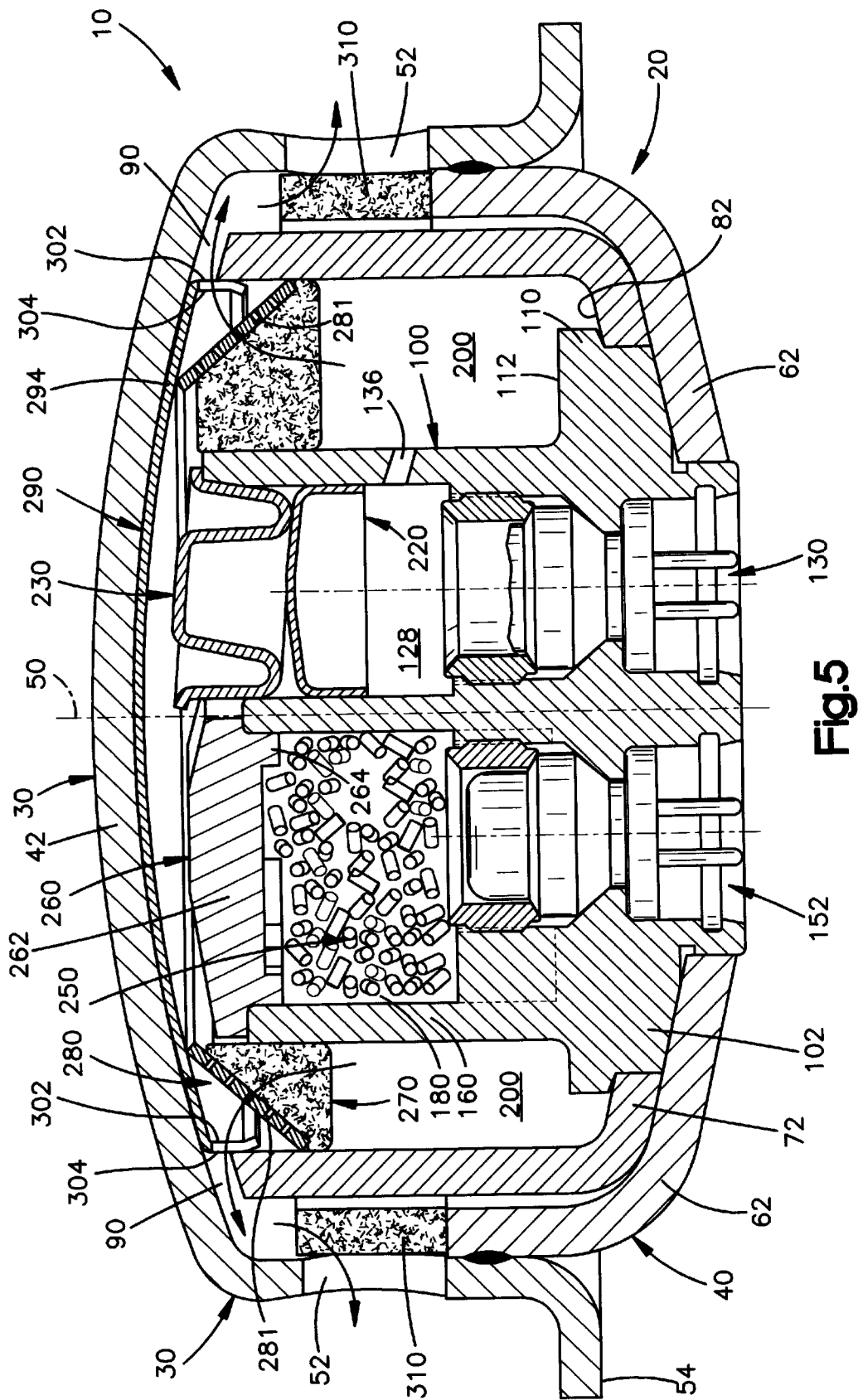
FIG. 5 is a view similar to FIG. 2, showing the inflator in a first actuated condition.

The upper end surface 80 of the combustion cup side wall 74 and the inner side surface 46 of the upper housing part 30 define a fluid passage 90 (FIGS. 2, 5 and 6) in the inflator 10. Because the combustion cup side wall 74 is cylindrical, the fluid passage 90 has an annular configuration extending around and centered on the axis 50. The fluid passage 90 is located near the fluid outlets 52. The fluid passage 90, which is normally closed, opens upon actuation of the inflator 10 as described below.

The lower end wall 72 of the combustion cup 70 extends radially inward from the lower portion of the side wall 74 of the combustion cup. The lower end wall 72 has an inner side surface 82 which is presented toward the upper housing part 30. The lower end wall 72 has an outer side surface 84 which is in abutting engagement with the inner side surface 66 of the end wall 62 of the closure 40. The axial length of the combustion cup 70 is selected so that the combustion cup is trapped or captured axially between the upper housing part 30 and the closure 40. The lower end wall 72 of the combustion cup 70 also has a ring-shaped end surface 86.

Figure 4:
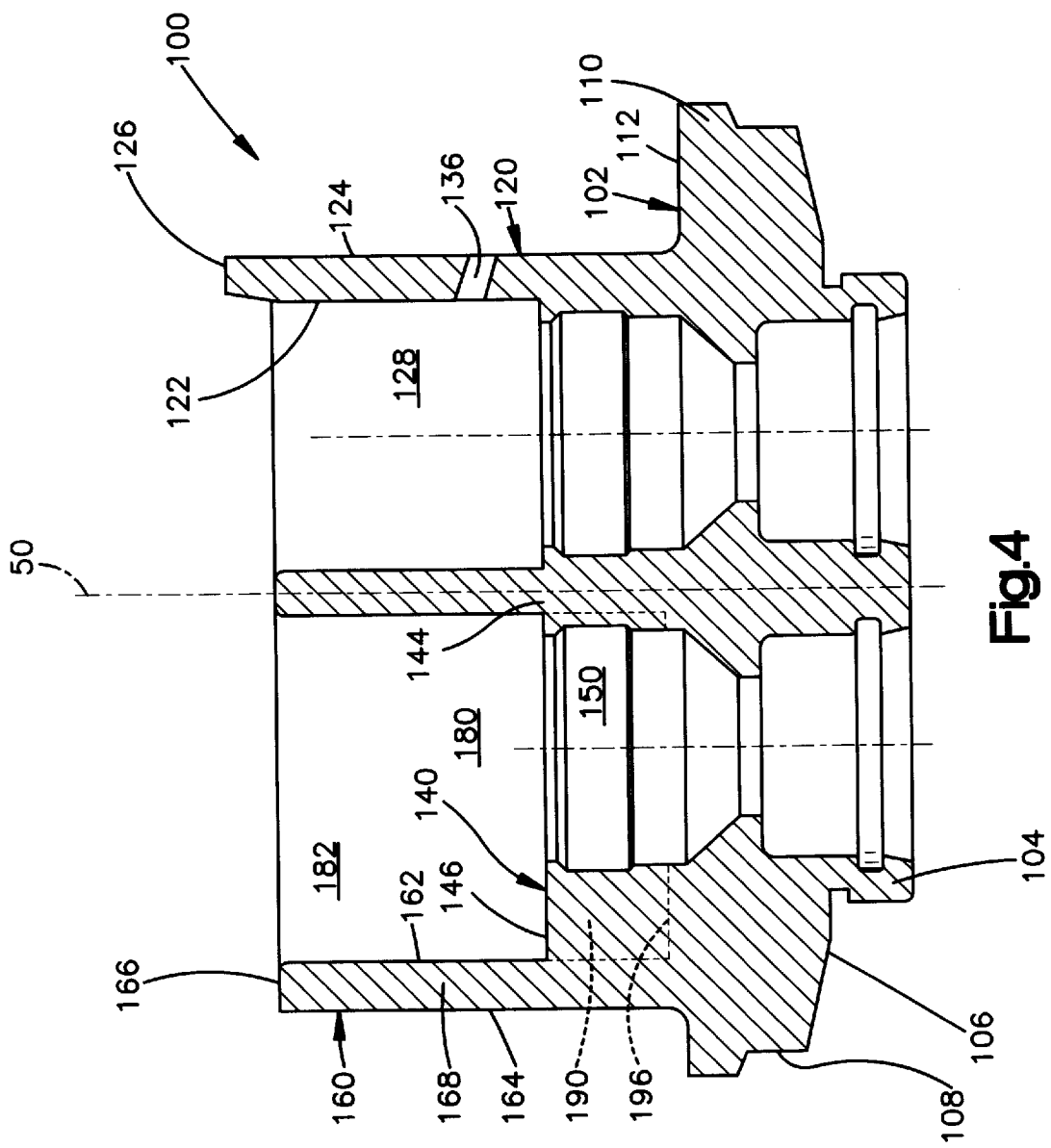
FIG. 4 is a sectional view of an igniter housing which forms a part of the inflator of FIG. 1.

The inflator 10 includes an igniter housing 100 (FIGS. 3 and 4). The igniter housing 100 is located centrally in the inflator 10. The igniter housing 100 includes a mounting portion 102, a primary initiator wall 120, a secondary initiator wall 140, and a secondary propellant chamber wall 160.

The mounting portion 102 of the igniter housing 100 is disposed at the lower end (as viewed in FIG. 4) of the igniter housing 100. A cylindrical end portion 104 of the mounting portion 102 extends into the circular central opening 68 in the end wall 62 (FIG. 2) of the closure 40. Above the end portion 104, the mounting portion 102 has a radially extending lower side surface 106 which is in engagement with the inner major side surface 66 of the closure 40.

The mounting portion 102 has a cylindrical outer side surface 108 that extends upward from the lower side surface 106 and that is in engagement with the cylindrical end surface 86 on the combustion cup 70. A flange 110 of the mounting portion 102 projects radially outward from the upper end of the side surface 108 and overlies the inner major side surface 82 of the combustion cup 70. A radially extending upper major side surface 112 of the mounting portion 102 defines the upper surface of the flange 110. The end surface 86 of the combustion cup 70 is disposed adjacent to and underlies the flange 110 of the igniter housing 100. The igniter housing 100 helps to locate the combustion cup 70 radially in the inflator 10.

The primary initiator wall 120 of the igniter housing 100 projects axially from the upper side surface 112 of the mounting portion 102. The wall 120 has a cylindrical configuration including parallel, axially extending inner and outer side surfaces 122 and 124. The wall 120 has a radially extending upper end surface 126. The wall 120 is not centered on the axis 50. The axis 50 extends through the wall 120.

The primary initiator wall 120 defines a primary ignition chamber 128 radially inward of the wall. A primary initiator 130 is mounted in the primary ignition chamber 128. The primary initiator 130 is a known device which is electrically actuatable by an electric current applied through terminals 132 to generate combustion products. A sleeve 134 is press fit between the primary initiator 130 and the wall 120 to secure the initiator in position in the igniter housing 100. The primary initiator cavity chamber 128 and the primary initiator 130 are disposed at a location in the inflator 10 not centered on the axis 50.

A plurality of ports or passages 136 (FIG. 4) are formed in the primary initiator wall 120, above the primary initiator 130. The passages 136 extend between the primary ignition chamber 128 and the exterior of the igniter housing 100.

The secondary initiator wall 140 (FIGS. 3 and 4) of the igniter housing 100 projects axially from the upper side surface 112 of the mounting portion 102 of the igniter housing 100. The wall 140 has a generally cylindrical configuration extending parallel to the axis 50. The wall 140 has an outer side surface 142 (FIG. 3) and a generally annular upper end surface 146 (FIG. 4).

The secondary initiator wall 140 has a portion 144 in common with the primary initiator wall 120. The secondary initiator wall 140 is not centered on the axis 50. The inflator axis 50 extends through the common wall portion 144.

The secondary initiator wall 140 defines a secondary ignition chamber 150 radially inward of the wall 140. The center of the secondary ignition chamber 150 and the center of the primary ignition chamber 128 lie on a straight line which extends through the axis 50, as can be seen from FIG. 3.

A secondary initiator 152 is mounted in the secondary ignition chamber 150. The secondary initiator 152 is a known device which is electrically actuatable by an electric current applied through terminals 154 to generate combustion products. A sleeve 156 is press fit between the secondary initiator 152 and the wall 140 to secure the initiator in position in the igniter housing 100.

The secondary propellant chamber wall 160 of the igniter housing 100 extends axially upward from the upper side surface 112 of the mounting portion 102 of the igniter housing. The wall 160 is spaced, throughout most of its circumference, outward from and encloses the secondary initiator wall. The secondary propellant chamber wall 160 has parallel, axially extending inner and outer side surfaces 162 and 164. The wall 160 has a radially extending upper end surface 166.

The secondary propellant chamber wall 160 has a generally kidney-shaped configuration when viewed in plan (from above as viewed in FIG. 2, or as viewed in FIG. 3). The wall 160 includes a cylindrical major portion 168 (FIG. 3) that has a radius of curvature centered on the axis 50 and that is spaced farthest from the axis and closest to the side wall 74 of the combustion cup 70. Two minor portions 170 and 172 of the wall 160 have a smaller radius of curvature than the major portion 168. The minor wall portions 170 and 172 curve inward from the ends of the major wall portion 168 and merge into the primary initiator wall 120.

A secondary propellant chamber 180 is defined inside the secondary propellant chamber wall 160. At a location above (as viewed in FIG. 2) the upper surface 146 of the secondary initiator chamber wall 140, an upper portion 182 of the secondary propellant chamber 180 has a kidney-shaped configuration within the entire extent of the wall 140. The kidney-shaped configuration includes a cylindrical central portion and two lobes which extend outward from the central portion. At a location below the upper surface 146 of the secondary initiator chamber wall 140, a lower portion 190 of the secondary propellant chamber has two parts which lie on opposite sides of the secondary initiator wall 140.

A floor surface 196 (FIG. 3) on the mounting portion 102 of the igniter housing 100 is disposed slightly above (as viewed in FIG. 2) the upper major side surface 112. The floor surface 196 comprises two small kidney-shaped portions disposed inside the secondary chamber wall 160 and outside the secondary initiator wall 140. These two surface portions 196 form the bottom of the secondary propellant chamber 180.

A ring-shaped primary propellant chamber or combustion chamber 200 (FIG. 2) is defined inside the combustion cup 70 and outside the igniter housing 100. The radially outer boundary of the primary propellant chamber 200 is the cylindrical inner side surface 76 of the side wall 74 of the combustion cup 70. The radially inner boundary of the primary propellant chamber 200 is formed by the exterior of the igniter housing 100, including the primary initiator chamber side wall 120 and the secondary initiator chamber side wall 160.

The initiator chamber side walls 120 and 160, together, do not have a cylindrical outer surface, and so the primary propellant chamber 200 does not have a strictly annular configuration. Instead, the radial extent, or width, of the primary propellant chamber 200 is different at different points around the chamber. Specifically, the radial distance between the combustion cup 70 and the igniter housing 100 is smallest along the cylindrical portion 168 of the secondary propellant chamber side wall 160 (to the left as viewed in FIG. 3). The radial distance between the combustion cup 70 and the igniter housing 100 is larger at a diametrically opposite location adjacent the primary initiator chamber side wall 120, and is greatest at the two points in between where the wall 120 meets the wall 160.

A primary ignition material 210 (FIG. 2) is located in the primary ignition chamber 128, adjacent to and in contact with the primary initiator 130. The primary ignition material 210 is a known material which is ignitable by the primary initiator 130 and which, when ignited, generates combustion products. One suitable material is boron potassium nitrate, or $BKNO_3$. A known autoignition material is mixed in with the primary ignition material 210.

A cup-shaped metal igniter cap 220 is disposed in the primary ignition chamber 128 in the igniter housing 100. The igniter cap 220 contains the primary ignition material 210 in the primary ignition chamber 128. The igniter cap 220 has an axially extending, cylindrical side wall 222 which is press fit inside the primary initiator side wall 120 of the igniter housing 100. The igniter cap 220 also has a radially extending end wall 224.

A metal spring cap 230 closes the upper end of the primary ignition chamber 128 in the igniter housing 100. The spring cap 230 is spaced apart axially from the igniter cap 220, with open space between them. The spring cap 230 has an annular, U-shaped side wall 232 which is press fit inside the primary ignition side wall 120. The spring cap 230 also has a radially extending central wall 234.

The inflator 10 includes a first actuatable inflation fluid source 240 in the form of a solid propellant. The propellant 240 is located in the primary combustion chamber 200, surrounding the igniter housing 100. The propellant 240 is a known material which is ignitable by the combustion products of the primary ignition material 210 and which, when ignited, produces inflation fluid in the form of gas under pressure for inflating the air bag 14. The propellant 240 is illustrated as being provided in the form of a plurality of discs filling or substantially filling the primary propellant chamber 200. The propellant 240 could, alternatively, be provided in the form of small pellets or tablets.

The inflator 10 includes a second actuatable inflation fluid source 250 in the form of a solid propellant. The secondary propellant 250 is located in the secondary propellant chamber 180. The secondary propellant 250 is a known material which is ignitable by the secondary initiator 152 and which, when ignited, produces inflation fluid in the form of gas under pressure for inflating the air bag 14. The secondary propellant 250 may be made from the same material as the primary propellant 240. The secondary propellant 250 is illustrated as being provided in the form of a plurality of small pellets filling or substantially filling the secondary propellant chamber 180. The secondary propellant 250 could, alternatively, be provided in the form of discs or tablets.

A secondary cap 260 closes the upper end of the secondary propellant chamber 180 in the igniter housing 100. The secondary cap 260 has a radially extending central wall 262. The secondary cap 260 has a plurality of tabs 264 which fit inside the secondary combustion chamber wall 160 to hold the cap in place on the igniter housing 100. The secondary cap 260 contains the secondary propellant 250 in the secondary propellant chamber 180.

The inflator 10 includes a combustor heat sink 270 in the primary combustion chamber 200. The heat sink 270 has an annular configuration extending around the igniter housing 100. The heat sink 270 is formed as a knitted stainless steel wire tube which is compressed to the generally frustoconical shape illustrated in the drawings.

The inflator 10 also includes a heat sink retainer 280 in the primary combustion chamber 180. The heat sink retainer 280 is disposed between the heat sink 270 and the fluid passage 90. The heat sink retainer 280 is preferably formed from expanded metal having a plurality of openings 281.

Figure 7:
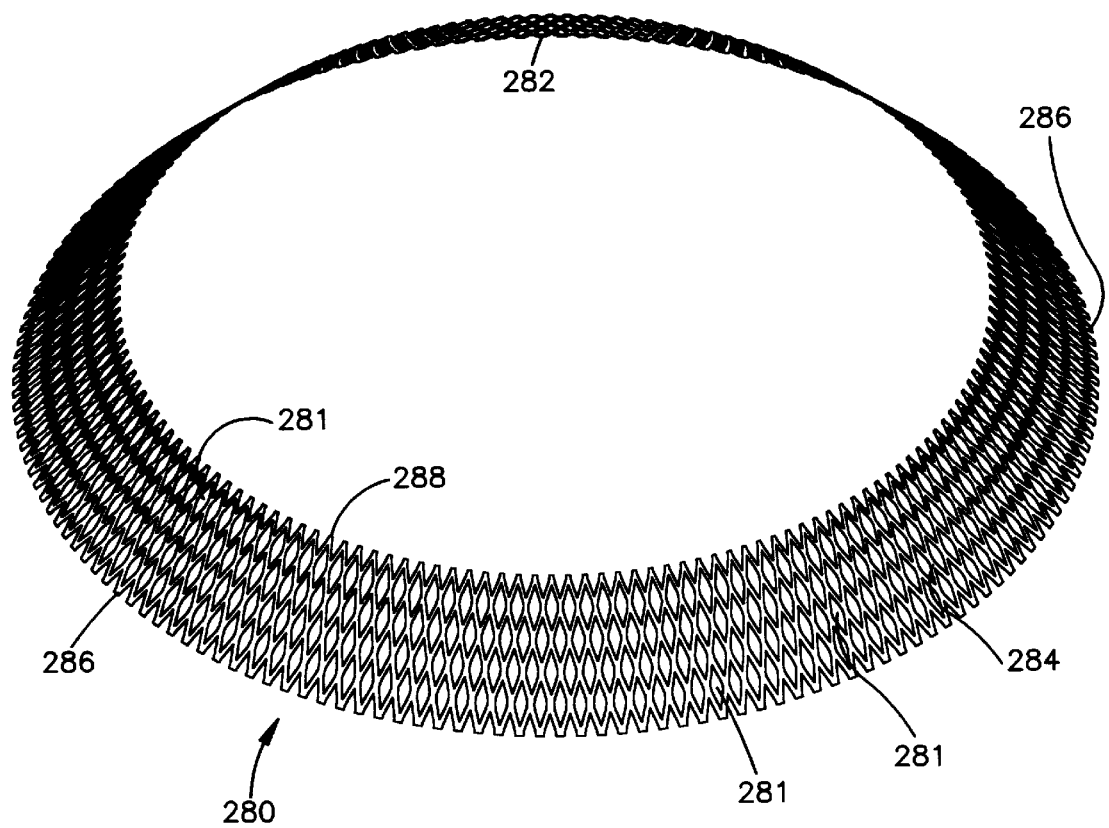
FIG. 7 is a perspective view of a heat sink retainer which forms a part of the inflator, in a direction facing toward the lower part of the inflator.

The heat sink retainer 280 (shown in more detail in FIG. 7) has a hollow, generally frustoconical shape. The retainer 280 has parallel inner and outer major side surfaces 282 and 284. The inner major side surface 282 of the retainer 280 overlies the heat sink 270. A radially outer edge 286 of the retainer 280 is in abutting engagement with the inner side surface 76 of the side wall 74 of the combustion cup 70. A radially inner edge 288 of the retainer 280 is in abutting engagement with the inner side surface of the outer edge portion 294 of the central wall 292 of the threshold cap 290.

The inflator 10 includes a second fluid flow control member in the form of a threshold cap 290. The threshold cap 290 is disposed radially inward of the combustion cup 70, and is located axially between the igniter housing 100 and the diffuser 30. The threshold cap 290 is made from stamped sheet metal, preferably aluminum, substantially thinner than the housing parts 30 and 40.

The threshold cap 290 (FIG. 2) is shaped generally like a throwing disc and has a domed main body portion or central wall 292 centered on the axis 50. The central wall 292 has a circular configuration including an annular outer edge portion 294. The central wall 292 has parallel inner and outer side surfaces 296 and 298.

An annular side wall 300 of the threshold cap 290 extends generally axially from the central wall 292. The side wall 300 of the threshold cap 290 has a plurality of openings in the form of slots 302. The slots 302 are spaced apart equally along the side wall 300, in a circular array centered on the axis 50. The slots 302 together form a fluid flow control passage 304 in the threshold cap 290. In the illustrated embodiment, the threshold cap 290 has six slots 302. A greater or lesser number of slots 302 may be provided to obtain the desired flow control characteristics of the inflator 10.

The inner side surface 296 of the central wall 292 of the threshold cap 290 is in abutting engagement with the end wall 234 of the spring cap 230. The outer side surface 298 of the central wall 292 of the threshold cap 290 is in abutting engagement with the inner side surface 46 of the end wall 42 of the diffuser 30.

The threshold cap 290 extends across the entire primary combustion chamber 200 of the inflator 10. The side wall 300 of the threshold cap 290 is in abutting engagement with the inner side surface 76 of the side wall 74 of the combustion cup 70, near the fluid passage 90. The heat sink retainer 280 is disposed in abutting engagement between the threshold cap 290 and the heat sink 270. The heat sink 270 is disposed in abutting engagement between the heat sink retainer 280 and the primary propellant 240. The heat sink 270 is resilient and cushions the primary propellant 240.

The igniter housing 100 is trapped or captured axially between the threshold cap 290 and the closure 40. Specifically, the distance between the spring cap 230 and the mounting portion 102 of the igniter housing 100 is selected so that, when the housing parts 30 and 40 are welded together with the igniter housing inside, the end wall 234 of the spring cap resiliently engages the inner side surface 296 of the central wall 292 of the threshold cap 290. The mounting portion 102 of the igniter housing 100 is pressed axially into engagement with the closure 40. The end wall 72 of the combustor cup 70 is trapped or captured axially between the flange 110 of the igniter housing 100 and the end wall 62 of the closure 40.

Prior to actuation of the inflator 10, the end surface 80 of the combustion cup side wall 74 seals against the inner side surface 46 of the diffuser end wall 42, so that the fluid passage 90 is closed and has zero flow area. The closed fluid passage 90 blocks fluid flow between the primary combustion chamber 200 and the fluid outlets 52, prior to actuation of the inflator 10. There is no other path for any significant amount of fluid to flow between the primary inflation fluid source 240 and the fluid outlets 52. Upon actuation of the inflator 10, as described below, the fluid passage 90 opens to enable inflation fluid to flow between the inflation fluid source 240 and the fluid outlets 52. The fluid passage 90, when open, has a smaller flow area than the fluid outlets 52 in the diffuser 30.

Prior to actuation of the inflator 10, the control passage 304 in the threshold cap 290 is also in a closed condition. The slots 302 in the threshold cap are substantially, if not completely, covered by the side wall 74 of the combustion cup 70. There is initially no significant gap between the side wall 300 of the threshold cap 290 and the side wall 74 of the combustion cup 70. The threshold cap 290 substantially blocks fluid flow between the primary combustion chamber 200 and the fluid passage 90. Upon actuation of the inflator 10, as described below, the threshold cap 290 moves and deforms to enable inflation fluid to flow through the slots 302.

In the event of a vehicle crash at or above the first predetermined threshold level of crash severity, but below the second predetermined threshold level of crash severity, an electric signal is applied to the terminals 132 of only the primary initiator 130 (not the secondary initiator 152). The primary initiator 130 is actuated and ignites the primary ignition material 210. The combustion products of the primary ignition material 210 flow through the passages 136 into the primary combustion chamber 200. The force of the combustion products of the ignition material 210 causes the igniter cap 220 to slide axially along the side wall 120 of the igniter housing 100, into engagement with the spring cap 230. The primary igniter cap 220 during this time blocks flow of the combustion products out of the primary initiator chamber 128 past the end surface 126 of the primary ignition chamber side wall 120.

The combustion products flowing through the passages 136 into the primary propellant chamber 200 ignite the primary propellant 240. The primary propellant 240 combusts and produces inflation fluid under pressure in the primary propellant chamber 200. The pressure in the primary propellant chamber 200 rises rapidly to a pressure in the range of about 1,000 psi to about 2,000 psi or more.

The secondary cap 260 during this time blocks flow of combustion products from the primary propellant chamber (which surrounds the secondary cap) into the secondary propellant chamber 180. This prevents ignition of the secondary propellant 250 when the primary initiator 130 is actuated but the secondary initiator 152 is not actuated.

The material thickness of the housing 20 is selected so that the end walls 42 and 62 deform because of the pressure of inflation fluid in the housing upon actuation of the primary inflation fluid source 240. Specifically, the end wall 42 of the diffuser 30 deforms axially outward (in an upward direction as viewed in FIG. 2), from the condition shown in FIG. 2 to the condition shown in FIG. 5. Simultaneously, the end wall 62 of the closure 40 deforms axially outward in the opposite direction. The amount of deformation or deflection of the end walls 42 and 62 is dependent on the pressure in the housing 20. That is, the higher the pressure in the housing, the more the end walls 42 and 62 deflect outward.

As the diffuser 30 and closure 40 move away from each other, the fluid pressure on the inner side surface 296 of the threshold cap 290 causes the threshold cap to move with the diffuser, away from the closure. At the same time, the heat sink 270 and the heat sink retainer 280 also move with the threshold cap 290 and the diffuser 30, in a direction away from the closure 40. The movement of the threshold cap 290 exposes the slots 302 and opens the control passage 304, as described below, to enable inflation fluid to flow out of the primary propellant chamber 200 through the fluid passage 90.

The pressure of the inflation fluid in the primary propellant chamber 200 forces the mounting portion 102 of the igniter housing 100 against the end wall 62 of the closure 40. The force exerted by the inflation fluid on the flange 110 effects a fluid-tight seal between the igniter housing 100 and the closure 40.

As a result of the deformation of the end walls 42 and 62 of the housing parts 30 and 40, the distance between the end wall of the diffuser and the end wall of the closure increases. When the inflator housing 20 deforms, the combustion cup 70 is no longer trapped axially between the diffuser 30 and the closure 40. The pressure of the inflation fluid in the primary propellant chamber 200, acting in a downward direction (as viewed in FIG. 2) on the lower portion 72 of the combustion cup 70, holds the combustion cup in engagement with the end wall 62 of the closure 40. The combustion cup 70 therefore moves with the end wall 62 of the closure 40, in a direction away from the end wall 42 of the diffuser 30.

The upper end surface 80 of the combustion cup side wall 74 moves away from the inner side surface 46 of the end wall 42 of the diffuser 30. The fluid passage 90 opens and its flow area increases, because of the deformation of the housing 20. The side walls 120 and 160 of the igniter housing 100, the igniter housing mounting portion 102, the combustion cup 70, and the threshold cap 290 cooperate to direct all, or substantially all, of the inflation fluid flowing out of the primary propellant chamber 200 to flow through the fluid passage 90. There is no other path for any significant amount of fluid to flow between the inflation fluid source 240 and the fluid outlets 52.

The heat sink 270 cools and filters the inflation fluid flowing out of the primary propellant chamber 200. The heat sink 270 also filters particulate matter out of the inflation fluid. The heat sink retainer 280 prevents the material of the heat sink 270 from being forced into the slots 302 of the threshold cap 290 by the rapidly flowing inflation fluid.

The filtered inflation fluid flows through the openings 281 in the heat sink retainer 280. The inflation fluid flows out of the primary propellant chamber 200, through the slots 302 in the threshold cap 290, and toward the fluid passage 90. Inflation fluid flows through the fluid passage 90, through an annular final filter 310, and toward the inflation fluid outlets 52. The inflation fluid flows out of the primary propellant chamber 200 along the entire 360 degree extent of the fluid passage 90. The fluid outlets 52 direct the inflation fluid to flow out of the housing 20 to the inflatable device 14.

The flow area of the fluid passage 90 in the housing 20 varies in accordance with the pressure of inflation fluid in the housing 20. Specifically, the higher the pressure in the housing 20, the more the end walls 42 and 62 deflect or deform outward. The more the end walls 42 and 62 deflect outward, the more the end surface 80 of the combustion cup 70 moves away from the end wall of the diffuser 30, and the bigger the fluid passage 90 becomes. In one embodiment, the fluid passage 90 is typically about one-half millimeter in axial extent when the inflator 10 is actuated. Under extreme pressure conditions, the fluid passage 90 could have an axial extent of as much as two to three millimeters.

As the housing 20 deforms, the slots 302 in the threshold cap 290 progressively open, increasing the flow area of the control passage 304. At the same time, the fluid passage 90 between the diffuser 30 and the combustion cup 70 progressively opens. Because the fluid passage 90 has a 360 degree circumferential extent and the slots 302 have a limited circumferential extent, the flow area of the fluid passage 90 increases more rapidly than the flow area of the control passage 304. Thus, the fluid flow area through the slots 302 in the threshold cap 290 almost immediately becomes smaller than the fluid flow area through the gap or fluid passage 90 between the combustion cup 70 and the diffuser 30. Thus, the threshold cap 290 acts as a restrictor, or control, for the rate of fluid flow out of the inflator 10.

The flow area of the slots 302 in the threshold cap 290, which make up the control passage 304, varies in accordance with the pressure of inflation fluid in the housing 20. Specifically, the higher the pressure in the housing 20, the more the threshold cap 290 moves away from the closure 40. In addition, the outer edge portion 294 of the central wall 292 of the threshold cap 290 flattens against the end wall 42 of the diffuser 30. As a result, a greater portion of each one of the slots 302 in the threshold cap 290 is exposed, and the control passage 304 becomes bigger.

Because the flow area of the control passage 304 varies in accordance with the pressure of inflation fluid in the housing 20, the internal operating pressure of the inflator 10 is self-regulating. Any increased pressure in the primary propellant chamber 200 causes the control passage 304 to open further, thus allowing the pressure to be relieved and lowered. The range of peak operating pressures in the inflator 10 is, therefore, narrowed, reducing the structural requirements of the inflator housing 20 accordingly.

Controlling fluid flow in this manner, that is, through movement of the slotted threshold cap 290, can be more precise than controlling fluid flow with the gap 90 between the two deforming housing parts 30 and 40. In addition, it is relatively easy to vary the fluid flow characteristics for different inflators, by providing different threshold caps 290 having different opening sizes or configurations.

Because the peak pressures in the primary propellant chamber 200 are reduced by the increased opening of the variable control passage 304, effects of temperature change on the pressure in the primary propellant chamber are minimized. This can enable the use of a primary propellant 240 which is more pressure sensitive, that is, which has a higher burn rate exponent. In addition, with the secondary combustion chamber 180 being completely encircled by the primary combustion chamber 200, only the primary combustion chamber need be capable, itself, of sustaining the structural loads arising upon actuation of the inflator 10.

In the event of a vehicle crash at or above the second predetermined threshold level of crash severity, both the primary initiator 130 and the secondary initiator 152 (FIG. 6) are actuated. The actuation of the primary initiator 130 results in ignition of the primary propellant 240 as described above. Inflation fluid produced by the primary propellant 240 deforms the housing 20, moves the threshold cap 290, and flows out of the inflator 10 as described above.

Figure 6:
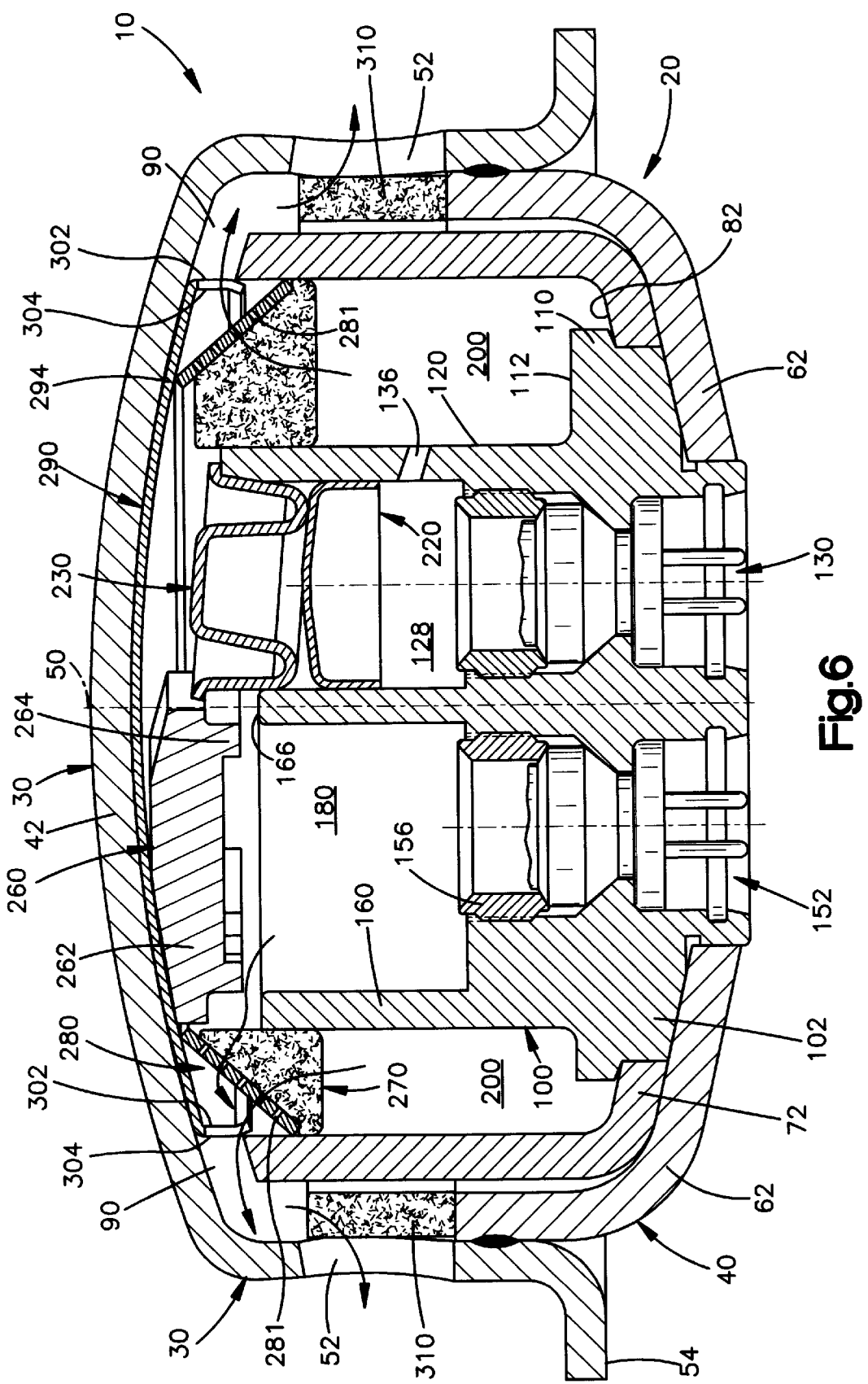
FIG. 6 is a view similar to FIG. 2, showing the inflator in a second actuated condition.

The secondary initiator 152 is actuated by an electric signal applied to the terminals 154 of the secondary initiator. The secondary initiator 152 ignites the secondary propellant 250. The secondary propellant 250 produces combustion products which increase the pressure in the secondary combustion chamber 180. This increased pressure acts on the secondary igniter cap 260 and causes the secondary igniter cap to move out of engagement with the igniter housing 100, as shown in FIG. 6. The increase of pressure also causes the housing 20 to deform more than it does when only the primary propellant 240 is ignited. This increased deformation of the housing 20 allows more movement of the threshold cap 290 and thus, if desired, more exposure of the slots 302.

The combustion products of the secondary propellant 250 join with the combustion products of the primary propellant 240 and flow into the heat sink 270, which has moved up along with the secondary igniter cap 260. The heat sink 270 cools and filters the combustion products of the secondary propellant 250. The resulting inflation fluid flowing out of the heat sink 270 flows through the slots 302 in the threshold cap 290 and thence out of the inflator 10 in the manner described above.

From the above description of the invention, those skilled in the art will perceive improvements, changes and modifications in the invention. For example, the present invention is applicable to inflators having only a single stage rather than a dual stage design as shown and described. Such improvements, changes and modifications within the skill of the art are intended to be covered by the appended claims.

Having described the invention, I claim:

1. An inflator for inflating an inflatable vehicle occupant protection device, said inflator comprising:
    a housing defining a generally ring-shaped propellant chamber extending around an axis of said inflator, said housing having a fluid outlet for directing flow of inflation fluid out of said housing to the inflatable device;
    a quantity of ignitable propellant located in said propellant chamber for, when ignited, producing inflation fluid for inflating the inflatable device;
    said housing having a fluid passage between said propellant chamber and said fluid outlet, said fluid passage being normally closed, said fluid passage opening upon actuation of said inflator to enable fluid flow from said propellant chamber to said fluid outlet, said fluid passage, when open, having a variable flow area depending upon the pressure in said housing;
    a heat sink located in said propellant chamber between said ignitable propellant and said fluid passage for cooling and filtering inflation fluid flowing from said propellant chamber through said fluid passage; and
    a retainer in said propellant chamber between said heat sink and said fluid passage for retaining said heat sink in said propellant chamber upon actuation of said inflator.

2. An inflator as set forth in claim 1 wherein said retainer has openings through which inflation fluid flows from said propellant chamber to said fluid outlet upon actuation of said inflator.

3. An inflator as set forth in claim 2 wherein said retainer is made from metal.

4. An inflator as set forth in claim 3 wherein said retainer is made from expanded metal.

5. An inflator as set forth in claim 1 wherein said housing deforms due to increase of pressure in said propellant chamber upon actuation of said inflator, said variable flow area of said fluid passage depending upon the amount of deformation of said housing.

6. An inflator as set forth in claim 5 wherein said housing comprises first and second housing parts at least one of which deforms due to increase of pressure in said propellant chamber, said heat sink and said retainer moving with said first housing part away from said second housing part.

7. An inflator as set forth in claim 1 wherein said heat sink is made from knitted metal wire which is compressed into a resilient state in said inflator.

8. An inflator as set forth in claim 1 wherein said heat sink and said retainer each have a generally frustoconical configuration.

9. An inflator as set forth in claim 1 wherein said heat sink and said retainer move together in said propellant chamber in response to ignition of said propellant.

10. An inflator for providing inflation fluid for inflating an inflatable vehicle occupant protection device, said inflator comprising:
    a housing defining a generally ring-shaped propellant chamber extending around an axis of said inflator, said housing having a fluid outlet for directing flow of inflation fluid out of said housing to the inflatable device;
    a quantity of ignitable propellant located in said propellant chamber for, when ignited, producing inflation fluid for inflating the inflatable device;
    said inflator having first and second fluid passages between said propellant chamber and said fluid outlet, said first and second fluid passages opening upon actuation of said inflator to enable fluid flow from said propellant chamber to said fluid outlet, said first and second fluid passages when open having variable flow areas depending upon the pressure in said housing;
    a heat sink located in said propellant chamber between said ignitable propellant and said first and second fluid passages for cooling and filtering inflation fluid flowing from said propellant chamber through said first and second fluid passages, said heat sink being made from metal wire; and
    a retainer in said propellant chamber between said heat sink and said first and second fluid passages for retaining said heat sink in said propellant chamber upon actuation of said inflator.

11. An inflator as set forth in claim 10 wherein said housing deforms due to increase of pressure in said propellant chamber upon actuation of said inflator, said variable flow areas of said first and second fluid passages depending upon the amount of deformation of said housing.

12. An inflator as set forth in claim 11 wherein said housing comprises first and second housing parts at least one of which deforms due to increase of pressure in said propellant chamber, said heat sink and said retainer moving with said first housing part away from said second housing part.

13. An inflator as set forth in claim 10 wherein said retainer has openings through which inflation fluid flows from said propellant chamber to said fluid outlet upon actuation of said inflator.

14. An inflator as set forth in claim 13 wherein said retainer is made from expanded metal.

15. An inflator as set forth in claim 10 wherein said heat sink is made from knitted metal wire which is compressed into a resilient state in said inflator.

16. An inflator as set forth in claim 10 wherein said heat sink and said retainer each have a generally frustoconical configuration.

17. An inflator as set forth in claim 10 wherein said heat sink and said retainer move together in said propellant chamber in response to ignition of said propellant.

* * * * *